United States Patent [19]
Aron

[11] Patent Number: 5,586,421
[45] Date of Patent: Dec. 24, 1996

[54] HAYMAKING MACHINE

[75] Inventor: Jerome Aron, Dossenheim Sur Zinsel, France

[73] Assignee: Kuhn S.A., Saverne Cedex, France

[21] Appl. No.: 501,808

[22] Filed: Jul. 13, 1995

[30] Foreign Application Priority Data

Jul. 13, 1994 [FR] France ................................. 94 08882

[51] Int. Cl.$^6$ ................................................. A01D 78/12
[52] U.S. Cl. ................................. 56/367; 56/370; 56/382; 56/396
[58] Field of Search ........................... 56/367, 365, 370, 56/372, 376, 377, 382, 383, 385, 396

[56] References Cited

U.S. PATENT DOCUMENTS

| | | |
|---|---|---|
| 3,650,101 | 3/1972 | Aron . |
| 4,144,699 | 3/1979 | Aron . |
| 4,149,364 | 4/1979 | Aron . |
| 4,286,427 | 9/1981 | van der Lely ........................ 56/370 X |
| 4,628,673 | 12/1986 | Aron . |
| 4,656,821 | 4/1987 | Aron . |
| 4,693,065 | 9/1987 | Aron et al. . |
| 4,723,404 | 2/1988 | Aron . |
| 4,875,332 | 10/1989 | Aron . |
| 4,914,901 | 4/1990 | Aron . |
| 4,922,700 | 5/1990 | Aron . |
| 4,953,346 | 9/1990 | Aron . |
| 5,024,053 | 6/1991 | Aron . |
| 5,060,465 | 10/1991 | Aron . |
| 5,274,990 | 1/1994 | Aron et al. . |

FOREIGN PATENT DOCUMENTS

| | | |
|---|---|---|
| 1589179 | 9/1967 | France . |
| 1457953 | 9/1962 | Germany . |
| 2150555 | 10/1971 | Germany . |
| 490786 | 5/1968 | Switzerland . |
| 474207 | 7/1968 | Switzerland . |
| 1220337 | 12/1966 | United Kingdom . |

*Primary Examiner*—Terry Lee Melius
*Attorney, Agent, or Firm*—Oblon, Spivak, McClelland, Maier & Neustadt, P.C.

[57] ABSTRACT

A haymaking machine in which fork-bearing arms are mounted in a pivoting fashion on a ring. These fork-bearing arms are controlled so that they can pivot about their respective longitudinal axes during rotation of the ring via a belt driving the ring and which is located at least in part near said ring, so that the area near the center of the rotor is clear. The fork-bearing arms are controlled in such a manner that their forks extend approximately vertical and will gather plants approximately on the entire forward half of their trajectory and that subsequently they are raised and the plants are deposited gently in the form of a swath. In this way the forage does not undergo any loss and it is not necessary to have a second rotor which works together with the swathing rotor in order to form a swath. Since the central part of the ring remains unobstructed, this allows passage of parts of the support frame and/or devices used for controlling the spacing with respect to the ground of the working forks.

16 Claims, 5 Drawing Sheets

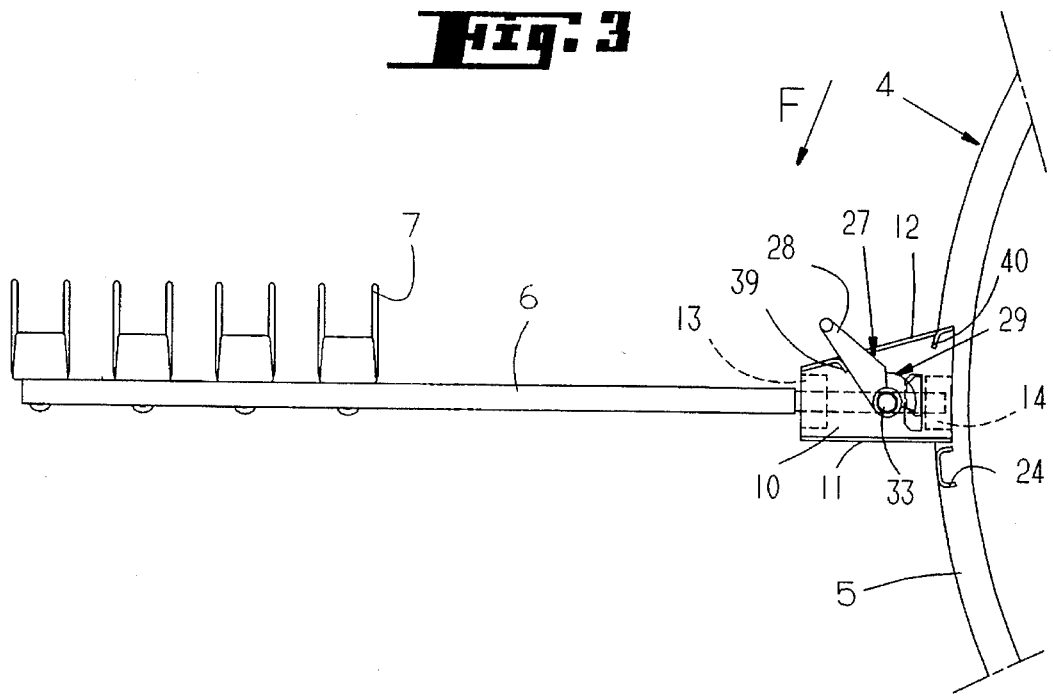
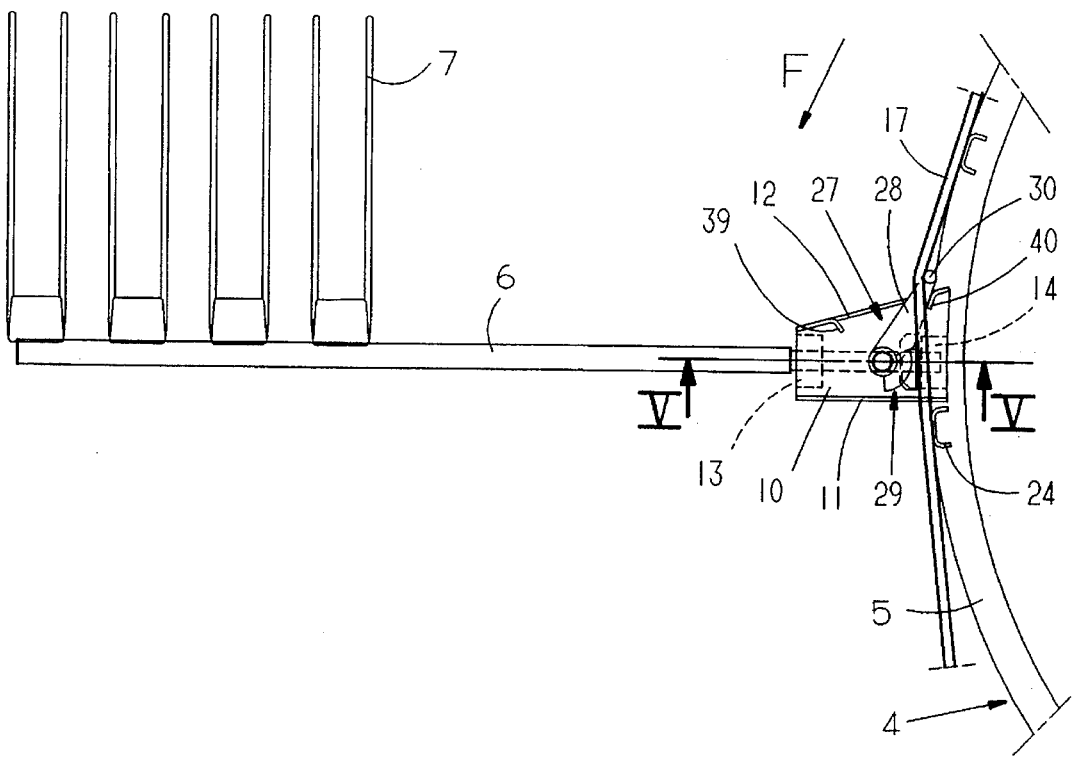

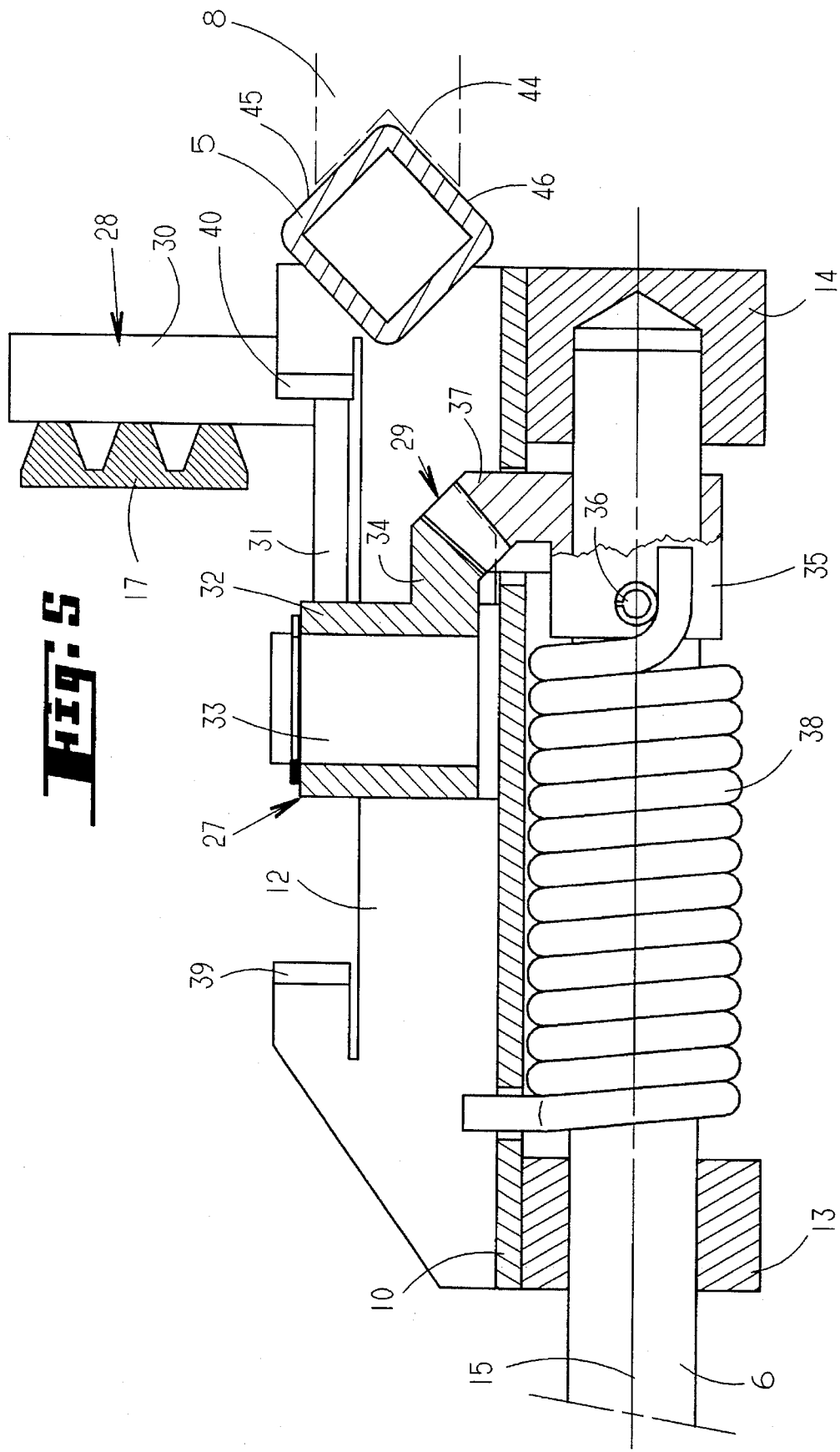

5,586,421

HAYMAKING MACHINE

BACKGROUND OF THE INVENTION

1. Field of the Invention

This invention relates to a haymaking machine, specifically a fodder swather, which includes a frame that can be coupled to a tractor and which is provided with carrying wheels, with the frame supporting a swath rotor which consists especially of a ring which holds several arms provided with working forks, this ring being supported by roller wheels and able to be rotated about a geometric axis which is vertical or slightly inclined with respect to the vertical.

2. Description of the Background Art

Such a rotor can have a large diameter, which allows one to obtain considerable working width. In addition, the rotor does not include a central support shaft. It is therefore possible to have parts of the support frame and/or means to control the distance from the working forks to the ground, which pass through the open middle area of the rotor.

On a known machine described in patent GB 1,220,337, the fork support arms of the rotor are articulated to the ring by means of shafts which are horizontal and approximately perpendicular to the longitudinal direction of said arms. A helical spring is connected to each of these arms and holds it in such a manner that its forks follow the ground.

Using such a rotor the forks throw the forage at a relatively high speed. During swathing this throwing action causes losses due to stripping of leaves and bruising.

In addition, it is necessary to use a second rotor which is placed in the projecting area of the first rotor. This second rotor has a diameter which is not as large as the first. It includes superposed teeth which are located at a certain distance from the ground. During formation of a swath, this second rotor turns in the direction opposite the direction of the first rotor. The fodder is then thrown to the rear, between the two rotors, in order to form a swath. However, this second rotor makes the machine more complicated and increases its weight and price.

SUMMARY OF THE INVENTION

It is an object of the present invention to provide a swather which does not have the aforementioned disadvantages.

The above and other objects are achieved according to the present invention by a haymaking machine in which fork-bearing arms are mounted in a pivoting fashion on a ring. These fork-bearing arms are controlled so that they can pivot about their respective longitudinal axes during rotation of the ring by means of a control member which is supported by the frame and is located at least in part near said ring, so that the area near the center of the rotor is clear.

The fork-bearing arms are controlled in such a manner that their forks extend approximately vertical and will gather plants approximately on the entire forward half of their trajectory and that subsequently they are raised and the plants are deposited gently in the form of a swath. In this case the forage does not undergo any loss and it is not necessary to have a second rotor which works together with the swather rotor in order to form a swath.

In addition, the central part of the ring remains unobstructed. This allows passage of parts of the support frame and/or devices used for controlling the spacing with respect to the ground of the working forks.

BRIEF DESCRIPTION OF THE DRAWINGS

Other characteristics and advantages of the invention will be apparent from the following description of examples of non-limiting implementation of the invention, with reference to the attached drawings in which:

FIG. 3 is a detail view of fork-bearing arm in position of raking;

FIG. 4 is a detail view of one arm with the forks raised;

FIG. 5 is a section along plane V-V of FIG. 4; and

DETAILED DESCRIPTION OF THE PREFERRED EMBODIMENTS

Figure 1:
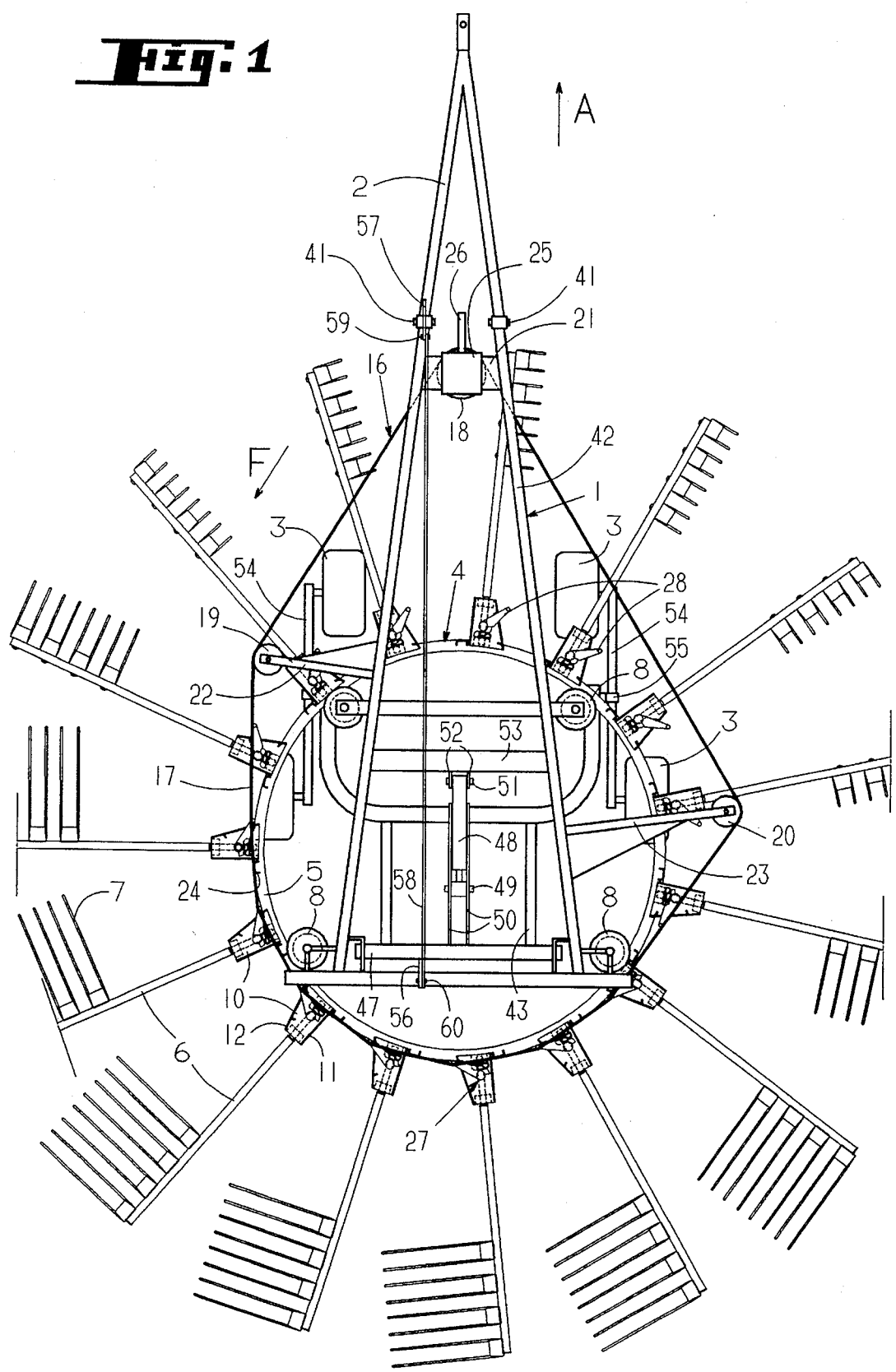
FIG. 1 is a top view of a machine according to the invention.
Figure 2:
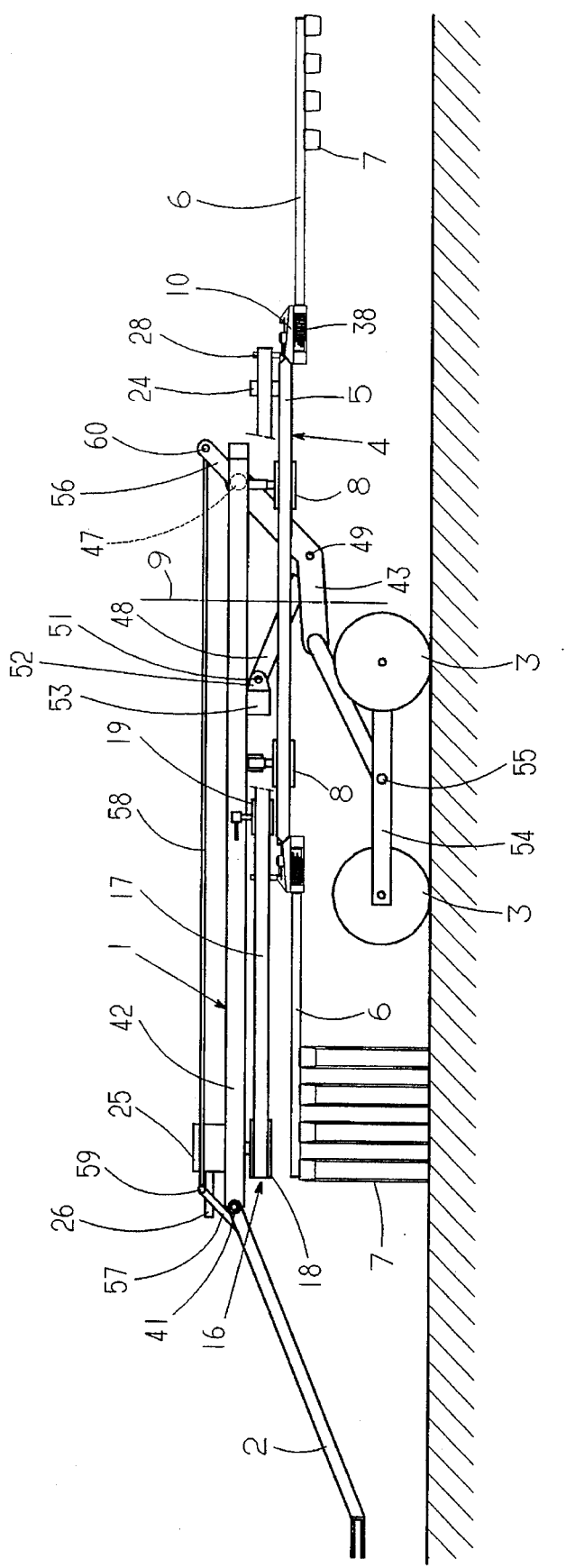
FIG. 2 is a side view, with a partial section, of the machine according to the invention.

As shown in FIGS. 1 and 2, the swather according to the invention includes a frame (1) which can be attached to a tractor, which is not shown, by means of a hitch (2). The latter is articulated at the front end of the frame (1) by means of shafts (41) which are approximately perpendicular to the direction of movement (A). The frame consists of a framework (42) of approximately triangular shape and a support piece (43) which is equipped with carrying wheels (3) which roll along the ground.

The framework (42) of frame structure (1) supports a swather rotor (4) which consists especially of a ring (5) on which radially extending arms (6) are mounted. Each of these arms (6) supports working forks (7) at its outside end. The framework (42) supports four roller wheels (S) which are arranged in a plane which is approximately horizontal for controlled guidance of the ring (5). Each of these roller wheels (S) has a V-shaped groove (44) on its periphery (FIG. 5). The ring (5) has a square section. It is guided within the grooves (44) by means of its internal sides (45 and 46). The ring (5) turns on these roller wheels (8) about a geometric axis (9) located at its center. This geometric axis (9) is vertical or slightly inclined with respect to the vertical.

The ring (5) carries support parts (10) for the fork-bearing arms (6) at approximately regular intervals on its periphery. These supports (10) consist of plates with two sides (11 and 12) which are directed upward. They are welded to the ring (5) and carry two bearings (13 and 14) in which the arms (6) extend. Between these arms (6) and said bearings (13 and 14) a small amount of play is provided so that they can pivot about their respective longitudinal axes (15).

The framework (42) of the frame structure (1) also supports a control member (16) for the fork-bearing arms (6) which causes them to pivot about their longitudinal axes (15) during rotation of the ring (5). This control member (16) is located at least in part in proximity to the ring (5), so that the area near the center of the rotor (4) is clear. It is advantageously located entirely on the outside of the ring (5).

In the example shown here this control member (16) consists of a belt (17). It can also consist of a chain or other similar part. This belt (17) is guided by means of three pulleys (18, 19 and 20) which are mounted on supports (21, 22 and 23) which are integral with the frame structure (1). Additionally, it passes over approximately vertical brackets (24) which are integral with the ring (5).

The pulley (18) is located in front of the ring (5) near the most forward end of the frame structure (1). It is mounted on a motor shaft which can be made to rotate, for example, by a tractor power take-off shaft. For this purpose this motor shaft is connected to a bevel gear drive located in a crankcase (25) with a second shaft (26) which can be connected to the power take-off shaft by an intermediate transmission shaft.

The two pulleys (19 and 20) are located with one on the left side and the other on the right side of the framework (42). Their support pieces (22 and 23) can be displaced along this framework (42) and can be fastened at different places.

The belt (17) passes over the brackets (24) of the ring (5) on the rear part of the latter. By means of contact with a large number of these brackets (24), the belt drives the ring (5) to rotate about the geometric axis (9) when it is itself driven by the pulley (18).

Between the belt (17) and each fork-bearing arm (6) are arranged devices (27) which actuate the arms (6). These devices (27) each consist of a crank (28) and a counter-driving motion (29) (see FIG. 5). Each crank (28) consists of an approximately vertical lever (30) which is located at the level of the belt (17), an approximately horizontal arm (31) and a socket (32). The latter is pivotally mounted on an approximately vertical shaft (33) which is integral with the corresponding support (10). The socket (32) includes a bevel gear sector (34), which is oriented downward and which extends over about one-third of the periphery of the socket (32).

A ring (35) is secured to each fork-bearing arm (6) by means of a pin (36). This ring (35) includes a bevel gear sector (37) which is directed upward and which extends over about one-third of the periphery of the ring (35). This sector (37) engages with the aforementioned sector (34) with which it forms an angle of about 90°.

A rotary spring (38) is additionally mounted on each fork-bearing arm (6). This spring (38) has one end resting on pin (36) and the other end resting on support (10). It therefore exerts a pressure on the fork-bearing arm (6) which tends to cause it to pivot about its longitudinal axis (15), so that it occupies the raking position shown in FIG. 3.

The edge (12) of the support (10) includes two stops (39 and 40) which limit displacements of the crank (28). On the front half of the ring (5) (i.e., that half facing the direction of movement (A)), the cranks (28) are pressed against the first stops (39) by the springs (38). The latter act on the arms (6) and, via the two gear sectors (37 and 34), against the cranks (28). In this position the forks (7) of the arms (6) are approximately vertical. On the rear half of the ring (5), the belt (17) is in contact with the levers (30) of the cranks (28). It displaces the cranks about their pivoting axes (33) and presses them against the second stops (40). The gear sectors (34 and 37) then turn the fork-bearing arms (6) about 90° against the force of the springs (38) so that the forks (7) are approximately horizontal.

The support (43) of the frame structure (1) passes inside the ring (5). It is articulated to framework (42) by means of a shaft (47) which is approximately perpendicular to the direction of movement (A). A hydraulic jack (48) is articulated by means of a shaft (49) on the side rails (50) of the support (43) and by means of a shaft (51) on plates (52) which are integral with a cross member (53) of the framework (42). This hydraulic jack (48) allows one to move the framework (42) about the axis of articulation (47) with respect to the support piece (43), thereby adjusting the distance with respect to the ground of the framework (42) and the rotor (4).

The wheels (3) of the support (43) are mounted in pairs on beams (54). The latter are articulated on support (43) by means of shafts (55) which are approximately perpendicular to the direction of movement (A).

The support (43) additionally includes a lever (56) which extends upward beyond its axis of articulation (47) with the framework (42). The hitch (2) includes, near its end which is connected to the framework (42), a lever (57) which extends upward beyond the axis of articulation (41) with said framework (42). These two levers (56 and 57) are approximately parallel to one another and have approximately the same length. A rail (58) which is approximately parallel to the framework (42) connects the two levers (56 and 57). This rail (58) is articulated to the lever (57) of the hitch (2) by means of an axis (59) and to the lever (56) of the support (43) by means of a second axis (60). These two axes (59 and 60) are approximately perpendicular to the direction of movement (A) and approximately parallel to the axes of articulation (41 and 47) of the hitch (2) and of the support (43) on the framework (42). The rail (58), the framework (42) and the two levers (56 and 57) thereby approximate a deformable parallelogram.

Figure 6:
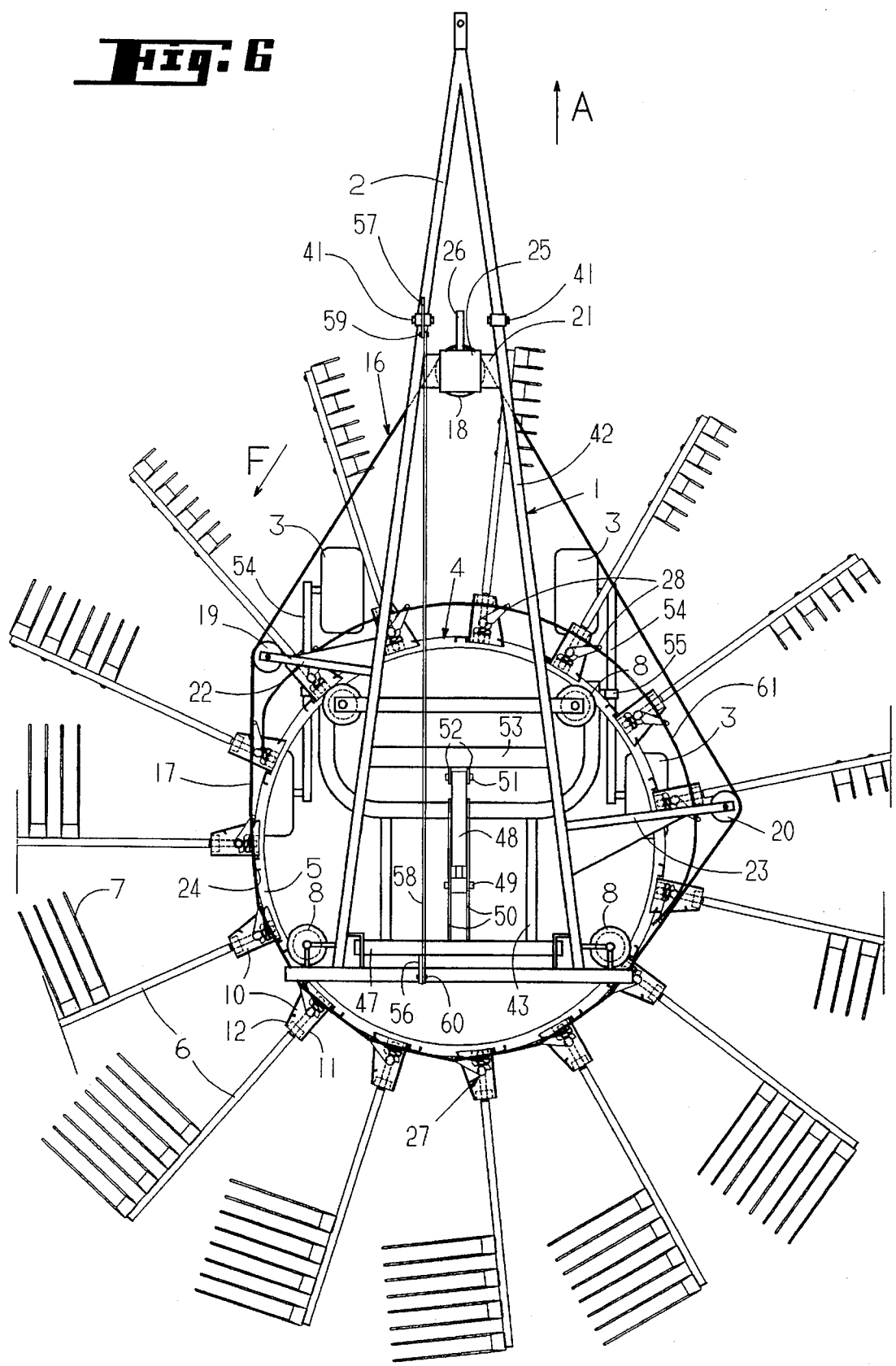
FIG. 6 is a view from above of a machine according to another embodiment.

The embodiment of FIG. 6 differs from the previously described one in that the frame (1) carries a rail (61) for controlled guidance of cranks (28), on the part thereof in front of the ring (5). This rail (61) is approximately parallel to said ring (5). It extends at such a distance from this ring (5) that it maintains the cranks (28) in contact with the first stops (39). This rail (61) allows one to suppress the springs (38) and ensure greater stability of the arms (6) and forks (7) in the raking position.

During swathing using the two examples described above, the framework (42) and the rotor (4) are lowered by means of the hydraulic jack (48) until the forks (7), which are directed downward, touch the ground. Because of the parallelogram arrangement of the framework (42), the rail (58) and the levers (56 and 57), said framework (42) and the rotor (4) remain practically parallel to the ground during their height-wise movements. In addition, the coupling fork of the hitch (2) remains approximately at the same level. The machine is then drawn in the direction of movement (A) by means of the tractor. The belt (17) is driven in the direction of the arrow (F) by the pulley (18). In turn it drives the ring (5) with the fork-bearing arms (6) in the same direction. The latter then turns on the roller wheels (8) about the geometric axis (9).

During this rotation, the fork-bearing arms (6) which are located on the front part of the ring (5) rake the plants which are lying on the ground. When they arrive at the lateral part of the ring (5), their cranks (28) are brought into contact with the belt (17). The latter displaces the cranks (28) about their axes (33) until they meet the second stops (40). At the time of these displacements, the gear sectors (34 and 37) cause pivoting of the fork-bearing arms (6) about their longitudinal axes (15). In the example according to FIGS. 1 to 5, these pivoting movements are made against the force of springs (38). The forks (7) are thus rotated to be horizontal, so that they deposit the raked plants in the form of a swath (FIG. 4). These forks (7) remain in the elevated horizontal position over the entire rear part of the ring (5).

Next, the belt (17) is guided by the pulley (20) so that it moves away from the ring (5) and releases the cranks (28). At the same time the springs (38) cause the arms (6) to pivot about their longitudinal axes (15). The arms (6) drive the corresponding cranks (28), through the intermediary of the gear sectors (37 and 34), until they meet the first stops (39).

In this position the forks (7) are again located in the raking position (FIG. 3). In the example according to FIG. 6, it is the rail (61) which causes the cranks (28) to pivot so that they cause the arms (6) and the forks (7) in the raking position to pivot.

In order to place the machine in the transport position the user stops rotation of the rotor (4). Next he actuates the hydraulic jack (48) so that it lifts the framework (42) with the rotor (4) and removes the forks (7) from the ground. The fork-bearing arms (6) can then be partially dismantled in order to reduce the width of the machine.

It is quite evident that the invention is not limited to the modes of implementation described here and shown on the attached drawings. Modifications are possible, especially concerning the make-up of the different elements or by substitution of technical equivalent devices, without thereby departing from the scope of protection for the invention.

What is claimed:

1. A haymaking machine comprising:
   a wheeled supporting structure which can be attached to a tractor;
   a swathing rotor supported by said supporting structure and comprising:
   a) a ring supported by roller wheels for rotation about an approximately vertical geometric axis,
   b) a plurality of arms mounted to said ring for rotation about longitudinal axes of said arms,
   c) a plurality of working forks mounted to said arms, and
   d) a plurality of actuating devices located in proximity to said ring connected to said arms so as to rotate said arms; and
   a driven control member supported by said supporting structure and located at least in part near said ring, said control member cooperating with said actuating devices for rotating said arms.

2. The haymaking machine according to claim 1, wherein said control member is located outside said ring.

3. The haymaking machine according to claim 1, wherein said control member comprises at belt which is guided by pulleys carried by said supporting structure, at least one of said pulleys being driven.

4. The haymaking machine according to claim 3, wherein one part of said control member is in contact with the actuating devices so as to rotate said arms and another part of said control member is out of contact with the actuating devices.

5. The haymaking machine according to claim 4, wherein said actuating devices each comprises a substantially vertical shaft, a crank articulated to said shaft, a first gear sector mounted to said crank, and a second gear sector meshing with said first gear sector, with which it forms an angle of about 90° said second gear sector being fastened to a corresponding one of said arms.

6. The haymaking machine according to claim 5, including a rotary spring associated with each of said arms.

7. The haymaking machine according to claim 5, including a rail supported by said supporting structure and positioned for guiding said cranks while said control member is out of contact with the actuating devices.

8. The haymaking machine according to claim 5, wherein said ring includes supports for said arms and for said substantially vertical shafts of the cranks, said supports for said arms and said substantially vertical shafts including two stop pieces which limit displacements of a corresponding one of said cranks.

9. The haymaking machine according to claim 3, including a drive pulley for driving said belt.

10. The haymaking machine according to claim 9, wherein said belt drives said ring about said geometric axis.

11. The haymaking machine according to claim 1, wherein each said roller wheel has a V-shaped groove supporting sides of said ring.

12. The haymaking machine according to claim 1, wherein said supporting structure comprises:
    a framework of approximately triangular shape and mounting said ring;
    a support having carrying wheels and articulated to the framework via a shaft which extends substantially perpendicular to a direction of movement of the haymaking machine; and
    a hydraulic jack connected for adjusting a height of said framework with respect to the support.

13. The haymaking machine according to claim 12, wherein said framework has a cross member, said support has rails and said hydraulic jack is articulated between said rails and said cross member.

14. The haymaking machine according to claim 12, including a hitch articulated to a front end of said supporting structure via shafts extending substantially perpendicular to the direction of movement of the haymaking machine.

15. The haymaking machine according to claim 14, including a first lever mounted to said support, a second lever mounted to said hitch, and that a rail is articulated to the first and second levers.

16. The haymaking machine according to claim 15, wherein said rail, said framework of the supporting structure, and said first and second levers approximate a deformable parallelogram.

\* \* \* \* \*